(12) United States Patent
Roda et al.

(10) Patent No.: US 11,984,242 B2
(45) Date of Patent: May 14, 2024

(54) FLAME-RETARDANT ELECTRICAL CABLE

(71) Applicant: Prysmian S.p.A., Milan (IT)

(72) Inventors: Elena Roda, Milan (IT); Franco Galletti, Merlino (IT)

(73) Assignee: Prysmian S.P.A., Milan (IT)

( * ) Notice: Subject to any disclaimer, the term of this patent is extended or adjusted under 35 U.S.C. 154(b) by 585 days.

(21) Appl. No.: 17/109,243

(22) Filed: Dec. 2, 2020

(65) Prior Publication Data

US 2021/0210254 A1 Jul. 8, 2021

(30) Foreign Application Priority Data

Dec. 6, 2019 (IT) .......................... 102019000023169

(51) Int. Cl.
*H01B 7/295* (2006.01)
*C08L 27/06* (2006.01)
*C08K 3/22* (2006.01)

(52) U.S. Cl.
CPC .............. *H01B 7/295* (2013.01); *C08L 27/06* (2013.01); *C08K 2003/2224* (2013.01); *C08K 3/2279* (2013.01); *C08L 2201/02* (2013.01); *C08L 2203/202* (2013.01)

(58) Field of Classification Search
CPC ..................................................... H01B 7/295
See application file for complete search history.

(56) References Cited

U.S. PATENT DOCUMENTS 5,173,960 A * 12/1992 Dickinson .............. H01B 7/295
                                                              385/100
2010/0292379 A1  11/2010 Fung et al.
2016/0208077 A1   7/2016 Neese et al.
2017/0023098 A1*  1/2017 Burlett ..................... F16G 5/20
2017/0047143 A1*  2/2017 Bacquet ............... H01B 7/1895
2020/0118710 A1   4/2020 Sirin et al.
2020/0369857 A1* 11/2020 Kim ....................... H01B 3/443

FOREIGN PATENT DOCUMENTS

| CN | 110092991 A      | 8/2019 |
|----|------------------|--------|
| WO | WO-2015050766 A1 | 4/2015 |
| WO | WO-2016101979 A1 | 6/2016 |
| WO | WO-2019002917 A1 | 1/2019 |

OTHER PUBLICATIONS

Search Report dated Jun. 30, 2020 in Italian Patent Application No. IT 201900023169 (with English translation of Categories), 3 pages.

* cited by examiner

*Primary Examiner* — Chau N Nguyen
(74) *Attorney, Agent, or Firm* — Element IP, PLC.

(57) ABSTRACT

A flame-retardant electric cable having a core comprising at least one electric conductor, an electrically insulating coating and an outermost layer made from a flame-retardant polymer composition comprising:
a) polyvinylchloride (PVC) as base polymer;
b) 25-45% (70-110 phr) by weight of at least one metal hydroxide;
c) 0.4-3% (about 1-8 phr) by weight of an optionally surface-treated montmorillonite having average particle dimensions of from 5 to 20 μm;
d) 1.2-3% (about 3-8 phr) by weight of antimony trioxide;
wherein the sum of the amount of montmorillonite and antimony trioxide is at least 5.5 phr and wherein the antimony trioxide and montmorillonite are in a ratio of from 1:0.1 to 1:2.5.

13 Claims, 1 Drawing Sheet

FLAME-RETARDANT ELECTRICAL CABLE

FIELD OF APPLICATION

Figure 1:
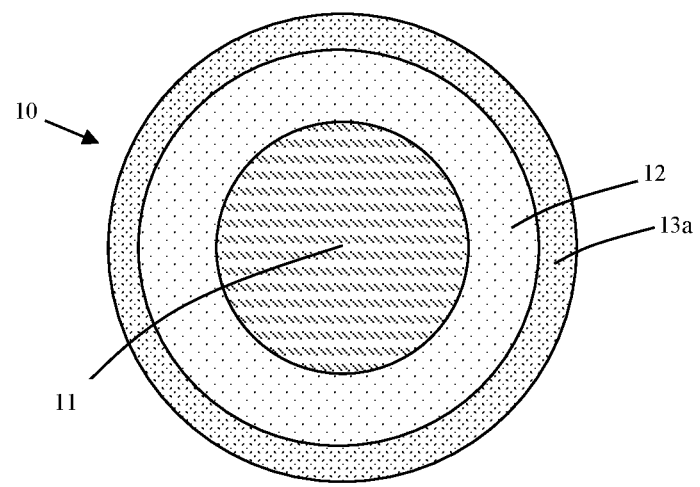

The present disclosure relates to a flame-retardant electrical cable.

In particular, the present disclosure relates to a flame-retardant electrical cable having a flame-retardant PVC-based jacket which exhibits reduced dripping (occurrence of droplets) when exposed to high temperatures, e.g. in case of fire.

The cable according to the disclosure can be used for low-voltage (LV) applications.

Prior Art

As known, an important requirement for electric cables, especially for building application, is an effective good behaviour in case of fire (as specified for example in the standard IEC 60332-3-24 (2000)), so as to avoid flame propagation and smoke generation in houses or, more generally, in premises where persons reside. The cable performances against fire can depend on the cable outer jacket which should have certain properties in case of fire.

In this connection, it is known to produce the jacket of electric cables from a polymeric composition having flame-retardant properties per se or imparted by the addition of a suitable flame-retardant filler which is extruded over the conductor core of the cable.

Polyvinyl chloride (PVC) is a polymeric material widely used in cable construction. Pure PVC is rather rigid and to make it suitably flexible for cable manufacturing plasticizers are added to it, the very commonly used being phthalates as from, for example, WO 2013/048775.

PVC is inherently resistant to flame. However, the majority of plasticizers used to impart flexibility to the PVC polymer, can compromise this important technical characteristic.

Therefore, when plasticizers are added to a PVC polymer in order to make it flexible for cable manufacturing, also suitable flame-retardant fillers should be added so that the resulting PVC polymer composition provides a coating for the cable with suitable flame-retardant properties.

A commonly used flame-retardant filler for PVC is antimony trioxide.

Under certain circumstances, the electric cables can also be required to have an outer jacket, for example made of a PVC polymer composition, that is not only flame retardant, but also has a low or null dripping, i.e. in case of fire it should not easily burn, neither melt, because if so, it could expose the electrical insulation and/or further feed the fire by hot bits detaching therefrom.

The flame retardancy and low/null dripping of an electric cable can be evaluated for compliance with and certified by national and/or international standards.

Some standards, particularly international standards, are more and more stringent about the performances required to a flame-retardant cable to the end of improving the safety in buildings in case of fire.

The addition of flame-retardant fillers, such as magnesium hydroxide and/or aluminium hydroxide to a PVC-based polymeric material of the cable outer jacket enhances the effectiveness against flame progression, but has few impacts on limiting or preventing the dripping when the cable is exposed to high temperatures e.g. in case of fire.

CN110092991 discloses a long-life PVC cable comprising a wire, a PVC insulation layer and a PVC protective layer wherein the PVC protective layer comprises the following components: 100 parts of PVC resin; 5-10 parts of plasticizer; 1-5 parts of heat stabilizer; 10-15 parts of lubricant; 1-3 parts of flame retardant; 0.5-1 parts of toughening agent; 20-40 parts of filler; 1.5-3 parts of graphene fibre; 1-2 parts of carbon fibre; 0.5-1 parts of polyethylene fibre.

The flame-retardant is selected, inter alia, from antimony trioxide, nanometre montmorillonite, nanometre silicon dioxide in at least two kinds. In Example 15, the flame retardant is a mixture of antimony oxide and nanometre montmorillonite in a 1:1 mass ratio (the total amount is 3 parts by weight).

SUMMARY OF THE DISCLOSURE

In view of the above, a main object of the present disclosure is providing a flame-retardant electric cable having the outermost layer (being the outer jacket or a skin covering the outer jacket) made of a PVC polymer composition which has improved fire performances, like reduced or no dripping (occurrence of droplets) when exposed to flame, so as to meet the stricter requirements for certification according to the current international standards.

Another object of the present disclosure is providing a flame-retardant electric cable as above which, in addition to having improved performances under fire, has good mechanical properties and is easily workable, for example by extrusion processes.

The Applicant found that an electric cable having an outer jacket made of a PVC polymer composition has improved flame-retardant properties, like a reduced or null dripping under fire, when its outermost layer comprises montmorillonite having micrometric particle dimensions and antimony trioxide, and wherein montmorillonite and antimony trioxide are present in a specific sum of amounts and ratio.

Accordingly, the present disclosure relates to a flame-retardant electric cable having a core comprising an electric conductor, an electrically insulating coating, and an outermost layer made from a flame-retardant polymer composition comprising:
a) 100 phr of polyvinylchloride (PVC) as base polymer;
b) 70-110 phr of a metal hydroxide;
c) 1-8 phr of an optionally surface-modified montmorillonite having average particle dimensions of from 5 to 20 μm;
d) 3-8 phr of antimony trioxide;
wherein the sum of the amount of montmorillonite and antimony trioxide is at least 5.5 phr and wherein the antimony trioxide and montmorillonite are in a ratio of from 1:0.1 to 1:2.5.

In an embodiment, the outermost layer is a jacket.

In another embodiment, the outermost layer is a skin layer covering the jacket. In an embodiment, the skin layer has a thickness of from 0.05 to 0.5 mm.

The Applicant found that a cable provided with the outermost layer made from a flame-retardant composition as specified above has improved reaction to fire performances, for example regarding a lower dripping or absence of dripping during burning.

In addition, the Applicant found that the provision of an outermost layer as specified above allows to impart suitable flame-retardant properties and improved resistance to dripping under fire to the cable without impairing its mechanical properties and workability of the polymer material forming the outermost layer, particularly in the extrusion step.

DETAILED DESCRIPTION

For the purpose of the present description and of the appended claims, the words "a" or "an" should be read to include one or at least one and the singular also includes the plural unless it is obvious that it is meant otherwise. This is done merely for convenience and to give a general sense of the disclosure.

Within the present description and the subsequent claims, unless indicated otherwise, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated therein.

In the present description, it is to be understood that the technical features described above and below can be combined with each other in any way, constituting further embodiments of the present disclosure which may not be specifically described for conciseness, but which fall within the scope of the present disclosure.

In the present description and claims, unless specified otherwise, the percentages by weight are based on the total weight of the flame-retardant polymer composition.

In the present description and claims, the amount of the components of the flame-retardant polymer composition is given in phr, where the term "phr" is used to indicate parts by weight per 100 parts by weight of the base polymeric material.

The cable according to the disclosure can be used particularly for low-voltage (LV) applications.

In the present description and the appended claims, as "low voltage cable" it is meant a voltage equal or less than about 1 kV.

The cable of the present disclosure is suitable to transport and distribute electric current for power and for telecommunication.

The cable according to the present disclosure can have one or more conductors.

In the present description and in the subsequent claims, as "conductor" is meant an element of elongate shape made of an electrically conductive metallic material, e.g. aluminium, copper, carbon nanotubes or composite thereof. The elongate shape element may be a solid rod or may be composed by a group of bundled or stranded wires.

Each conductor of the electrical cable of the invention is surrounded by an insulating layer, which can be in direct contact therewith. A jacket can surround one or more conductors.

In accordance with the present disclosure, at least the jacket is made from a flame-retardant PVC-based polymer composition. In the case, a skin is the outermost layer of the cable, the underlying jacket can be made from a flame-retardant PVC-based polymer composition optionally lacking montmorillonite.

In an embodiment, polyvinyl chloride has a K value of at least 65, more preferably a K value from 68 to 72. The K value, also referred to as intrinsic viscosity, indicates the mean molecular weight of PVC. The K value can be determined according to DIN EN ISO 1628-1 (1988).

The flame-retardant PVC-based polymer composition can also include at least one plasticizer, preferably at least one phthalate plasticizer.

The phthalate plasticizer can be selected from the group consisting of: di(2-ethylhexyl) phthalate (DEHP), diisononyl phthalate (DINP), diisodecyl phthalate (DIDP), diisotridecyl phthalate (DITP) and mixture thereof.

Other suitable plasticizers that can be used in addition or replacement for phthalates are e.g. chlorinated paraffins.

The flame-retardant polymer composition of the present disclosure further comprises a metal hydroxide in amount of 70-110 phr (corresponding to about 25-45 wt %), as flame-retardant filler.

In an embodiment, the metal hydroxide is selected from magnesium hydroxide, aluminium hydroxide or a combination thereof.

The metal hydroxide can be used in the form of particles which are untreated or surface-treated with saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; and the like.

An example of metal hydroxide suitable for the present cable is magnesium hydroxide, for example of natural origin (brucite), optionally surface-treated.

The flame-retardant polymer composition of the present disclosure further comprises antimony trioxide in an amount of 3-8 phr (corresponding to about 1.2-3 wt %), as additional flame-retardant filler. An amount of antimony trioxide lower than 3 phr (1.2 wt %) brings no substantial effect in the flame-retardant polymer composition; while an amount of antimony trioxide greater than 8 phr (3 wt %) does not add any improvement to the cable performance and would increase the production costs of the flame-retardant polymer composition and of the cable obtained therefrom.

In an embodiment, the amount of antimony trioxide can be of 5-8 phr (corresponding to about 2-3 wt %).

The range of amounts indicated above for the at least one metal hydroxide and for antimony trioxide are suitable to impart adequate flame-retardant properties to the outer sheath of the cable without impairing its mechanical properties, particularly its elongation characteristics.

The flame-retardant polymer composition of the present disclosure further comprises an optionally surface-treated montmorillonite having average particle size dimensions of from 5 to 20 μm.

In an embodiment, the optionally surface-treated montmorillonite has particle size dimensions of from 10 to 20 μm, for example particle size dimensions of from 15 to 20 μm.

The montmorillonite of the present disclosure may be naturally occurring and can be layered. In an embodiment, the naturally occurring montmorillonite may be purified according to conventional purification processes before its use in the flame-retardant polymer composition of the present disclosure.

The montmorillonite of the present disclosure can be surface-coated with an ammonium cation-containing compound, such as a salt. Suitable ammonium coated montmorillonites for the present cable contain alkyl ammonium and polyol ammonium. In an embodiment, the ammonium coated montmorillonite contains (is surface treated with) a dialkyl di(hydrogenated $C_{16}$-$C_{18}$) ammonium, for example dimethyl, di(hydrogenated tallow) ammonium.

The cationic coating allows to increase the compatibility of montmorillonite with the polymeric matrix.

The amount of the optionally surface-treated montmorillonite in the flame-retardant polymer composition of the present disclosure is in the range of 1-8 phr (corresponding to about 0.4-3 wt %). An amount of optionally surface-treated montmorillonite lower than 1 phr (0.4 wt %) brings no substantial effect in the flame-retardant polymer composition; while an amount of optionally surface-treated montmorillonite greater than 8 phr (3 wt %) can cause a decrease of the mechanical properties of the composition, for example in term of tensile strength and elongation at break, thus making the composition not suitable for an electric cable.

In an embodiment, the amount of optionally surface-treated montmorillonite can be of at least 7 phr (corresponding to about 2.5 wt %).

In accordance with the present disclosure, the sum of the amount of montmorillonite and antimony trioxide is at least 5.5 phr. For example, the sum of the amount of montmorillonite and antimony trioxide is at least 7.5 phr. For example, the sum of the amount of montmorillonite and antimony trioxide is at least 16 phr at most.

In an embodiment, the antimony trioxide and montmorillonite are in a ratio of from 1:0.1 to 1:2.5. For example, the antimony trioxide and montmorillonite are in a ratio of from 1:0.1 to 1:1.2.

In an embodiment, the antimony trioxide and montmorillonite are in a ratio of from 1:0.1 to 1:1.2 and the sum of the amount of montmorillonite and antimony trioxide is at least 7.5 phr.

In an embodiment, the antimony trioxide and montmorillonite are in a ratio of from 1:0.1 to 1:1.2, the sum of the amount of montmorillonite and antimony trioxide is at least 7.5 phr and the amount of antimony trioxide is in the range of 3.5-8 phr, for example in the range of 5-8 phr.

Applicant experienced that the presence of an optionally surface-treated montmorillonite having micrometric particle dimensions as indicated above in the flame-retardant polymeric composition used for the manufacture of the outermost layer of the cable together with antimony trioxide and at least one metal hydroxide in the amounts and ratio indicated above, not only contributes to improve the flame-retardant properties of the polymeric composition forming such coating, but also increases significantly its resistance to dripping under fire conditions.

In particular, Applicant experienced that montmorillonite having micrometric particle dimensions as indicated above promotes the formation of substantially compact and homogeneous cohesive carbon residues ("char") of such outermost layer when it is exposed to a flame, for example in the event of a fire, which results in a reduction of the dripping of the polymeric material forming such coating and in a significant increase of the fall time of incandescent fragments of the polymeric material, e.g. during the flame test.

According to the Applicant's experience, the compactness of such carbon residues (char) improves as the amount of montmorillonite increases and a further improvement can be achieved with the increase of the amount of antimony trioxide.

Thus, when the flame-retardant composition of the present disclosure is used for the manufacture of the outermost layer of the cable (e.g. the jacket or a skin layer coating the jacket), optionally surface-treated montmorillonite promotes, under fire, the formation a surface crust made substantially of compact and homogenous char having reduced gas permeability, which protects the underlying part of the cable preventing its burning and dripping for a significantly more prolonged period of time.

The above benefits are achieved while maintaining good mechanical and workability characteristics of the flame-retardant polymer composition.

The Applicant observed that the presence of surface-treated montmorillonite eases the extrusion of the polymer composition containing it. In particular, the addition of surface-treated montmorillonite in the above-mentioned amount decrease by 15-20% the viscosity of the polymer composition with respect to a composition not containing it.

The flame-retardant polymer composition may further comprise conventional components such as antioxidants, processing aids, stabilizers, pigments, coupling agents, etc.

Conventional antioxidants which are suitable for this purpose are by way of example: polymerized trimethyldihydroquinoline, 4,4'-thiobis (3-methyl-6-tert-butyl) phenol, pentaerythritol tetrakis [3-(3,5-di-tert-butyl-4-hydroxyphenyl) propionate], 2,2'-thio-diethylene-bis-[3-(3,5-di-tert-butyl-4-hydroxy-phenyl) propionate] and the like or mixtures thereof.

Process aids usually added to the base polymer are, for example, calcium stearate, zinc stearate, stearic acid, paraffin wax, silicone rubbers and the like, and mixtures thereof.

The lubricants used are, for example, paraffin waxes of low molecular weight, stearic acid, stearammide, oleammide, erucamide.

A coupling agent may be used with the aim of further improving compatibility between the flame-retardant inorganic fillers such as magnesium hydroxide and polymer matrix. This coupling agent can be selected from those known in the art, for example: saturated silane compounds or silane compounds containing at least one ethylenic unsaturation; peroxides or mixtures thereof. As an alternative, a monocarboxylic acids or dicarboxylic acids anhydrides, optionally grafted onto the polymeric base, may be used.

The electrical cable according to the present disclosure may be produced based on cable manufacturing techniques known to those skilled in the art. In particular, the outermost layer may be formed using conventional processes with a thickness chosen to comply requirements and needs and standards of the specific application for the cable.

For example, the flame-retardant polymer composition according to the present disclosure can be prepared by mixing PVC base polymer, flame-retardant fillers (metal hydroxide(s) and antimony trioxide), optionally surface-treated montmorillonite and optionally further additives in the respective amounts using an internal mixer of the type with tangential rotors (Banbury) or with interpenetrating rotors, or alternatively in continuous mixers such as those of the type Ko-Kneader (Buss), or of the type co-rotating or counter-rotating twin-screw.

The flame-retardant polymer composition so obtained is preferably used in a non-crosslinked form, to obtain a coating with thermoplastic properties. Such flame-retardant polymer composition is used to produce at least the outermost layer of the cable by extrusion onto a cable core containing one or more conductors according to extrusion techniques that are known in the art.

The cable according to the disclosure can be used for the transport of electric energy or data (telecommunication application). In one embodiment, the cable according to the disclosure is used for the transport of low voltage electric currents (LV), i.e. electric currents having a voltage not exceeding 1 kV.

Figure 2:
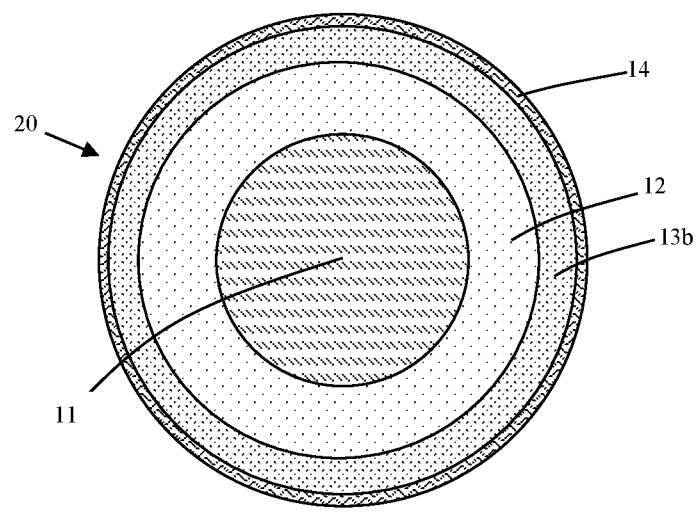

The features and advantages of the present disclosure will be made apparent by the following detailed description of some exemplary embodiments thereof, provided merely by way of non-limiting examples, description that will be conducted also by referring to the attached drawings, wherein FIG. 1 is a cross-sectional view of an electric cable according to the present disclosure; and FIG. 2 is a cross-sectional view of another electric optical cable according to the present disclosure.

FIG. 1 shows a cable 10 according to a non-limiting embodiment of the disclosure. Cable 10 has a core comprising a conductor 11 made of an electrically conductive material, e.g. aluminium, copper, carbon nanotubes or composite thereof. The conductor 11 may be in the form of a solid bar or a of bundle of wires, for example stranded.

In the cable of the disclosure, the core may include a single conductor or preferably a plurality of conductors.

The conductor 11 is electrically insulated by an insulating layer 12 in form of an extruded polymeric coating optionally having flame-retardant properties. For example, the insulating layer 12 can be made of an extruded polymeric material such as PVC, optionally filled with flame-retardant fillers, such as magnesium or aluminium hydroxide, or by an LS0H material, as described, for example, in WO9905688.

In the embodiment shown in FIG. 1, the insulating layer 12 is extruded in direct contact with the conductor 11.

Cable 10 comprises a jacket 13a as outermost layer, made of a PVC polymeric material having flame-retardant properties according to the present disclosure. The jacket 13a surrounds the insulating layer 12 and, optionally, is in direct contact thereof. The jacket 13a is manufactured by extrusion. The jacket 13a has a thickness suitable for providing the cable with mechanical protection.

FIG. 2 shows a cable 20 according to another non-limiting embodiment of the disclosure. In the cable 20, those features that are structurally and/or functionally equivalent to corresponding features of the cable 10 described above will be assigned the same reference numbers of the latter and will not be further described for conciseness.

The cable 20 differs from the cable 10 described above in that the outermost layer is a skin layer 14, made of a PVC polymeric material having flame-retardant properties according to the present disclosure.

The skin layer 14 surrounds and directly contacts the jacket 13b. The skin layer 14 is manufactured by extrusion. The skin layer 14 has a thickness substantially smaller than that of the jacket 13b (of from 0.05 to 0.5 mm, for example of from 0.1 to 0.2 mm) and does not provide significant mechanical protection to the cable 20.

In this embodiment, the jacket 13b is made of a flame-retardant PVC polymer composition. A composition suitable for the jacket of the present cable is, for example, similar to that used for the outermost layer (the skin layer 14) but lacking any montmorillonite.

The outermost layer of the cable of the disclosure, being either a jacket (as in the case of the cable 10 of FIG. 1) or a skin layer (as in the case of the cable 20 of FIG. 2) is made from a flame-retardant polymer composition described above.

The present disclosure will now be described with reference to the following examples which are provided for purpose of illustration only and thus are not to be construed as limiting the scope of the present disclosure in any way.

Example 1

Preparation of Test Compositions According to the Disclosure and Comparative Composition.

Comparative flame-retardant polymer base compositions (hereinafter referred to as Samples from A to F and Sample P) and test compositions according to the disclosure (hereinafter referred to as samples from G to O) have been prepared by mixing, in a laboratory turbomixer, a PVC polymer, plasticizers, fillers and additives as indicated in the following Table 1.

The polymer composition of comparative sample A included antimony trioxide ($Sb_2O_3$) and natural magnesium hydroxide (brucite). The polymer composition further included plasticizers.

The polymer compositions of comparative samples from B to D included the same components as comparative sample A and further included silicon dioxide as a reinforcing filler, flame-retardant and additive. The average particle size dimensions of silica were 0.15 μm.

The polymer compositions of samples from G to O according to the present disclosure included the same components as comparative sample A and further included an ammonium-surface treated montmorillonite having average particle size dimensions of 15-20 μm.

The polymer compositions of comparative samples E, F and P included the same components as samples from G to M according to the present disclosure but the sum of the amounts of montmorillonite and antimony trioxide (Samples E and F) or the montmorillonite/antimony trioxide ratio (Sample P) was outside the ranges provided by the present disclosure.

The polymer compositions indicated above were used to produce samples of both comparative and test samples by conventional extrusion techniques.

Table 1 shows the amounts of PVC base polymer, plasticizers, fillers and other additives in the compositions used to produce both comparative sample and samples according to the disclosure, where the comparative samples are marked with an asterisk.

The amounts are provided as "phr".

TABLE 1

| Samples | PVC | Mg(OH)$_2$ | Plasticizers | Sb$_2$O$_3$ | Montmorillonite (M) | Silicon dioxide | Additives | ΣM + Sb$_2$O$_3$ | Sb$_2$O$_3$:M |
|---|---|---|---|---|---|---|---|---|---|
| A* | 100.0 | 90 | 55.0 | 7.5 | — | — | 8.2 | — | — |
| B* | 100.0 | 90 | 55.0 | 3.5 | — | 4.0 | 8.2 | — | — |
| C* | 100.0 | 90 | 55.0 | 3.5 | — | 8.0 | 8.2 | — | — |
| D* | 100.0 | 90 | 55.0 | 7.5 | — | 8.0 | 8.2 | — | — |
| E* | 100.0 | 90 | 55.0 | 3.5 | 1.0 | — | 8.2 | 4.5 | 1:0.28 |
| F* | 100.0 | 90 | 55.0 | 3.5 | 0.5 | — | 8.2 | 4.0 | 1:0.14 |
| G | 100.0 | 90 | 55.0 | 3.5 | 2.0 | — | 8.2 | 5.5 | 1:0.57 |
| H | 100.0 | 90 | 55.0 | 3.5 | 4.0 | — | 8.2 | 7.5 | 1:1.14 |
| I | 100.0 | 90 | 55.0 | 3.5 | 8.0 | — | 8.2 | 11.5 | 1:2.28 |
| L | 100.0 | 90 | 55.0 | 7.5 | 8.0 | — | 8.2 | 15.5 | 1:1.06 |
| M | 0 | 90 | 55.0 | 7.5 | 1.0 | — | 8.2 | 8.5 | 1:0.13 |
| N | 0 | 90 | 55.0 | 7.5 | 2.0 | — | 8.2 | 9.5 | 1:0.26 |
| O | 0 | 90 | 55.0 | 7.5 | 4.0 | — | 8.2 | 11.5 | 1:0.53 |
| P* | 0 | 90 | 55.0 | 7.5 | 0.5 | — | 8.2 | 8.0 | 1:0.06 |

Example 2

Tests on Dripping and Char Formation Under Fire Conditions.

The samples obtained according to Example 1 were tested to determine their dripping behaviour under fire conditions and for mechanical properties.

The dripping tests were aimed at detecting the time of falling the first piece of the samples (fall time) and the formation of cohesive carbon residues (char) on them under fire conditions (anti-drop effect).

Specimens from plates having dimensions 100×150 mm and 3.0 thick were obtained from each sample and used for carrying out above evaluations.

Each specimen of a sample was clamped vertically from an upper end portion with a clamp fixed on a support while the lower end was free. The specimen was then burned under the action of a flame produced by a bunsen fed with air at a flow rate of 3.8 ml/min and with liquid propane gas (LPG) at a flow rate of 0.65 ml/min, maintaining the ratio between mass flow rates used.

The flame was oriented at about 90° with respect to the specimen and directed towards the lower edge of the specimen at the shorter side thereof.

The flame was held in this position for all the time of the experiment and the time from approaching the flame at the lower edge of the specimen until the first piece from the specimen falls off (fall time) was recorded.

With regard to the char formation, each specimen of a sample was clamped vertically from an upper end portion with a clamp fixed on a support while the lower end was free. The specimen was then burned as indicated above for 90 seconds and the specimen with its support were then immersed in cold water. Successively, the burned specimen was cut in the middle and the section of the cut burned specimen was observed to the microscope.

With regard to the mechanical properties, each specimen of a sample was evaluated for tensile strength (TS) and elongation at break (EB) according to IEC 60811-1-1 (1996).

The results are set forth in Table 2.

TABLE 2

| Sample | TS (MPa) | EB (%) | Fall time (seconds) | ΣM + $Sb_2O_3$ | $Sb_2O_3$:M |
|---|---|---|---|---|---|
| A* | 11.08 | 203 | 60 | — | — |
| B* | 14.6 | 222 | 75 | — | — |
| C* | 15.6 | 208 | 104 | — | — |
| D* | 13.3 | 190 | 92 | — | — |
| E* | 12.1 | 255 | 109 | 4.5 | 1:0.28 |
| F* | 12.6 | 224 | 73 | 4.0 | 1:0.14 |
| G | 12.6 | 239 | 129 | 5.5 | 1:0.57 |
| H | 12.7 | 146 | >240 | 7.5 | 1:1.14 |
| I | 11.7 | 176 | 197 | 11.5 | 1:2.28 |
| L | 11.8 | 138 | >240 | 15.5 | 1:1.06 |
| M | 12.8 | 255 | >240 | 8.5 | 1:0.13 |
| N | 14.2 | 261 | >240 | 9.5 | 1:0.26 |
| O | 11.2 | 194 | >240 | 11.5 | 1:0.53 |
| P* | 11.8 | 228 | n.d. | 8.0 | 1:0.06 |

From the above results it can be seen that comparative sample A, which is free of montmorillonite and silica, has acceptable mechanical properties, but low fall time (dripping starts after 1 minute under fire).

The addition of silica to the polymer composition in amounts of 4.0 or 8.0 phr (comparative samples B, C and D) results in a slight increase of the fall time, but the dripping still starts after less than 2 minutes under fire even when the amount of antimony trioxide is increased to 7.5 phr (comparative samples D).

The addition of montmorillonite to the polymer composition in place of silica in amounts such that the sum of the amounts of montmorillonite and antimony trioxide is below 5.5 (Samples E and F) results in a slight increase of the fall time with respect to comparative sample A, but the dripping still starts after less than 2 minutes under fire.

In the case of sample P, where the amount of montmorillonite is below that of the present disclosure (0.5 phr) and the antimony trioxide/montmorillonite ratio is below 1:0.1, a consistent value about its dripping time could not be obtained (not determined, n.d.), in spite of the fact the sum of the amounts of montmorillonite and antimony trioxide is within the range of the present disclosure.

The addition of montmorillonite to the polymer composition in a suitable amount and such that the sum of the amounts of montmorillonite and antimony trioxide at least 5.5, and montmorillonite/antimony trioxide is from 1:0.1 to 1:2.5 (Samples G to O) results in a substantial increase of the fall time (the dripping still starts after more than 2 minutes and in some cases after more than 4 minutes under fire). A cable outermost layer made of such polymer compositions improves the cable fire performances to meet the more stringent national and/or international standards. At the same time, the mechanical properties such as tensile strength and elongation at break are maintained within the standard requirements.

In addition, the presence of montmorillonite in the polymeric composition allows to obtain a more compact and uniform char on the burned samples obtained from such composition compared to the samples obtained from the polymeric composition including silica but not montmorillonite. This can be appreciated by the long dripping time of the samples according to the present disclosure.

The invention claimed is:

1. A flame-retardant electric cable having a core comprising an electric conductor, an electrically insulating coating and an outermost layer made from a flame-retardant polymer composition comprising:
   a) 100 phr of polyvinylchloride (PVC) as base polymer;
   b) 70-110 phr of a metal hydroxide;
   c) 1-8 phr of an optionally surface-treated montmorillonite having average particle dimensions of from 5 to 20 μm;
   d) 3-8 phr of antimony trioxide;
   wherein the sum of the amount of montmorillonite and antimony trioxide is at least 5.5 phr and wherein the antimony trioxide and montmorillonite are in a ratio of from 1:0.1 to 1:2.5.

2. The flame-retardant electric cable according to claim 1, wherein the outermost layer is a jacket.

3. The flame-retardant electric cable according to claim 1, wherein the outermost layer is a skin layer.

4. The flame-retardant electric cable according to claim 3, wherein the skin layer has a thickness of from 0.05 to 0.5 mm.

5. The flame-retardant electric cable according to claim 4, further comprising a jacket underlying the skin layer, wherein the jacket is made from a flame-retardant PVC-based polymer composition optionally lacking montmorillonite.

6. The flame-retardant electric cable according to claim 1, wherein the antimony trioxide and montmorillonite are in a ratio of from 1:0.1 to 1:1.2.

7. The flame-retardant electric cable according to claim 1, wherein the sum of the amount of montmorillonite and antimony trioxide is at least 7.5 phr.

8. The flame-retardant electric cable according to claim 1, wherein the amount of antimony trioxide is in the range of 5-8 phr.

9. The flame-retardant electric cable according to claim 1, wherein the metal hydroxide is magnesium hydroxide.

10. The flame-retardant electric cable according to claim 1, wherein the montmorillonite is surface-treated with a dialkyl di(hydrogenated $C_{16}$-$C_{18}$) ammonium.

11. The flame-retardant electric cable according to claim 1, wherein the amount of optionally surface-treated montmorillonite is of at least 7 phr.

12. The flame-retardant electric cable according to claim 1, wherein the antimony trioxide and montmorillonite are in a ratio of from 1:0.1 to 1:1.2, the sum of the amount of montmorillonite and antimony trioxide is at least 7.5 phr and the amount of antimony trioxide is in the range of 3.5-8 phr.

13. The flame-retardant electric cable according to claim 1, which is for low voltage application.

* * * * *